United States Patent [19]
Fauci et al.

[11] Patent Number: 5,942,971
[45] Date of Patent: Aug. 24, 1999

[54] ANTI-THEFT TIRE DISABLING DEVICE

[76] Inventors: Joseph Fauci, 351 Cameo Dr.; Joseph Paris, 3 Riviera Dr., both of Massapequa, N.Y. 11758

[21] Appl. No.: 09/167,049

[22] Filed: Oct. 6, 1998

[51] Int. Cl.⁶ .................................................. B60C 23/00
[52] U.S. Cl. ........................ 340/442; 340/447; 340/426; 280/287
[58] Field of Search ................... 340/425.5, 426, 340/442, 444, 447; 280/287; 116/33, 34 R, 8; 73/146.2, 146.5, 146.8

[56] References Cited

U.S. PATENT DOCUMENTS

| | | | |
|---|---|---|---|
| 3,661,115 | 5/1972 | Rosestein | 116/33 |
| 3,688,257 | 8/1972 | Mann | 180/287 |
| 3,910,221 | 10/1975 | Aske et al. | 116/33 |
| 4,375,200 | 3/1983 | Bertani et al. | 116/8 |
| 4,818,029 | 4/1989 | Mourot et al. | 301/5.24 |
| 4,947,151 | 8/1990 | Rosenberger | 340/426 |
| 5,419,408 | 5/1995 | Ellrodt et al. | 180/287 |
| 5,533,589 | 7/1996 | Critzer | 180/287 |
| 5,611,408 | 3/1997 | Abukhader | 180/287 |

*Primary Examiner*—Jeffery A. Hofsass
*Assistant Examiner*—Van T. Trieu
*Attorney, Agent, or Firm*—Collard & Roe, P.C.

[57] ABSTRACT

A system for deflating a tire on a wheel of a vehicle upon theft of the vehicle, comprising a wheel mounted unit and at least one remote unit for deactivating the wheel mounted unit via remote signals. The wheel-mounted unit is automatically armed upon stopping of the vehicle and comprises a pressure release assembly mounted in an orifice of the wheel for deflating the tire, a sensor adapted to sense wheel rotation and wheel speed, and a controller connected to the sensor and pressure release assembly for activating the pressure release assembly in response to wheel rotation sensed by the sensor. There is a receiver for receiving incoming RF signals from the remote unit, and a power supply connected to the pressure release assembly, sensor, controller and receiver. Each wheel could have its own wheel-mounted unit. After deflation, the wheel-mounted units are automatically re-set.

12 Claims, 3 Drawing Sheets

ANTI-THEFT TIRE DISABLING DEVICE

BACKGROUND OF THE INVENTION

1. Field of the Invention

This invention relates to an anti-theft device for vehicles. In particular, this invention relates to a remote-controlled device that automatically deflates one or more tires of a vehicle when it is stolen.

2. The Prior Art

Vehicle theft is a large problem all over the world. Consequently, there have been many attempts to provide devices and systems that prevent theft or facilitate the recovery of a vehicle after it has been stolen. Theft prevention systems include sophisticated alarm systems and mechanical devices such as "the Club", which prevents the steering wheel from turning and is highly visible. Recovery systems such as "Lojack" use a radio transmitter to locate the stolen vehicle.

There have also been several attempts to provide systems that disable the vehicle's tires upon theft of the vehicle. One example is discussed in U.S. patent application No. 4,818,029 to Mourot et al., which discloses a tire deflating device that is activated by the centrifugal force of the wheel rotating. The device is applied to the wheel by the owner upon parking the vehicle, and is installed onto the tire valve. This device has the disadvantage that the owner may forget to remove the device and suffer a flat tire when the vehicle is driven. Other similar devices are shown in U.S. Pat. Nos. 4,375,200 to Bertani et al., and 3,910,221 to Aske et al.

Another device is shown in U.S. patent application No. 3,688,257 to Mann, which discloses an anti-theft device that operates using a solenoid valve to remove a plug in the tire. The device is connected to the ignition switch which energizes the solenoids and keeps the plug in place for normal operation of the car. If the car is started without turning the ignition switch, the solenoids are not energized and the tire rotation causes probes to strike and break against the plugs to deflate the tire. While this device is a useful anti-theft system, it does not have sufficient safety measures to ensure that the tires are not accidentally deflated by the owner. Furthermore, the solenoids are located on the exterior of the wheel and are highly visible to thieves.

A remote-controlled anti-theft system is disclosed in U.S. Pat. No. 5,533,589 to Critzer et al., which disables an electrical component of the vehicle upon activation. A remote controlled alarm that is set to activate upon motion of a vehicle wheel is disclosed in U.S. Pat. No. 4,947,151 to Rosenberger. This device does not disable the tire.

Other anti-theft tire devices are shown in U.S. Pat. No. 5,419,408 to Ellrodt et al., U.S. Pat. No. 3,661,115 to Rosenstein, and U.S. Pat. No. 5,611,408 to Abukhader. None of the devices shown in these patents are convenient or safe for the average consumer to use, and result in destruction of the tire upon activation.

SUMMARY OF THE INVENTION

It is therefore an object of the present invention to provide an anti-theft tire disabling system that is easily activated and disabled by the owner of the vehicle.

It is another object of the present invention to provide a tire disabling system that does not destroy the tire during disablement.

It is yet another object of the present invention to provide a tire disabling system that is automatically armed upon parking the vehicle.

It is a further object of the present invention to provide a tire disabling system that is not apparent to a thief.

It is yet a further object of the present invention to provide a tire disabling system that is automatically re-set after deflating the tires.

These and other objects are accomplished by a tire disabling system comprising at least one wheel-mounted disabling unit that is automatically armed upon stopping the vehicle for a predetermined period of time, and a remote unit for selectively deactivating or disarming the wheel-mounted unit. The disabling unit comprises a pressure release assembly such as a plug or valve mounted into an orifice in the rim assembly of the wheel, a sensor for sensing tire rotation and/or speed, a power supply such as one or more batteries for activating the disabling unit, a receiver/transmitter for communicating signals with the remote unit and a dashboard mounted indicator and alarm, and a controller for controlling the normal operation of the disabling unit.

The power supply provides power to the receiver, sensor, transmitter, controller and pressure release assembly. The system has a "sleep" mode, in which little or no power is used. This way, the life of the battery is extended substantially.

The remote unit is preferably a hand-held remote unit that may or may not be attached to a keychain or incorporated within a vehicle remote locking unit. The remote unit operates on coded RF signals, similar to those used for remote key entry systems or garage door openers. Alternatively, other signals could be used as well.

The system is keyed to the rotation of the tires as sensed by the sensor, so that it is automatically armed when the vehicle is not moving after a predetermined period of time, such as 5 or 10 minutes. This ensures that the system will not be armed when the vehicle is stopped in traffic, but that it will automatically arm after the vehicle is parked for a longer period of time. Upon pressing a deactivation button on the remote unit, an RF signal is sent to the controller to deactivate the wheel mounted unit.

Unless deactivated by a signal from the remote unit, the controller activates the pressure release assembly upon a signal from the motion sensor. Preferably, the controller is programmed to engage the pressure release assembly only after the tire has rotated a significant amount, such as ten full rotations. Alternatively, the controller could engage the actuator after a predetermined period of time, such as thirty seconds.

The receiver/transmitter communicates a signal to a dashboard-mounted indicator to indicate the status of the system, i.e., in the "ready" or "off" mode. The indicator is connected to and powered by the vehicle's battery. In addition, the transmitter communicates an alarm to a signal light on the dashboard indicator in advance of the actuation of the pressure release assembly, so that driver has an opportunity to deactivate the system and prevent inadvertent deflation of the tires. The advance warning could be programmed to be 20 seconds, or any other desired amount of time. A thief cannot deactivate the system even upon becoming aware of impending deflation of the tires, because the only way to deactivate the system is with the hand-held remote.

Alternatively, there could be an emergency deactivation safety remote located inside the vehicle, so that the driver could deactivate the actuator upon sounding of the alarm. This might be a necessity if the driver is unable to locate the remote unit, or if the remote unit is inaccessible from the inside of the vehicle. The emergency deactivation button could be a portable battery operated button hidden inside the vehicle at a position determined by the driver, such as under the seat or in the glove compartment. Pressing the button would send an RF signal to the receiver to deactivate the system. This way, it could not be easily located by a thief, yet provide additional protection for the driver in the event that the remote unit is inaccessible.

Once the pressure release assembly is activated and the tire is deflated, the assembly is automatically reset to seal the tire. This is a simple procedure if the pressure release assembly is a valve, because the valve simply moves from a retracted position back into the orifice of the wheel to seal the orifice. This movement of the valve can occur automatically upon deactivation of the system by a signal from the remote unit. The tire must then be re-inflated to permit further driving.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
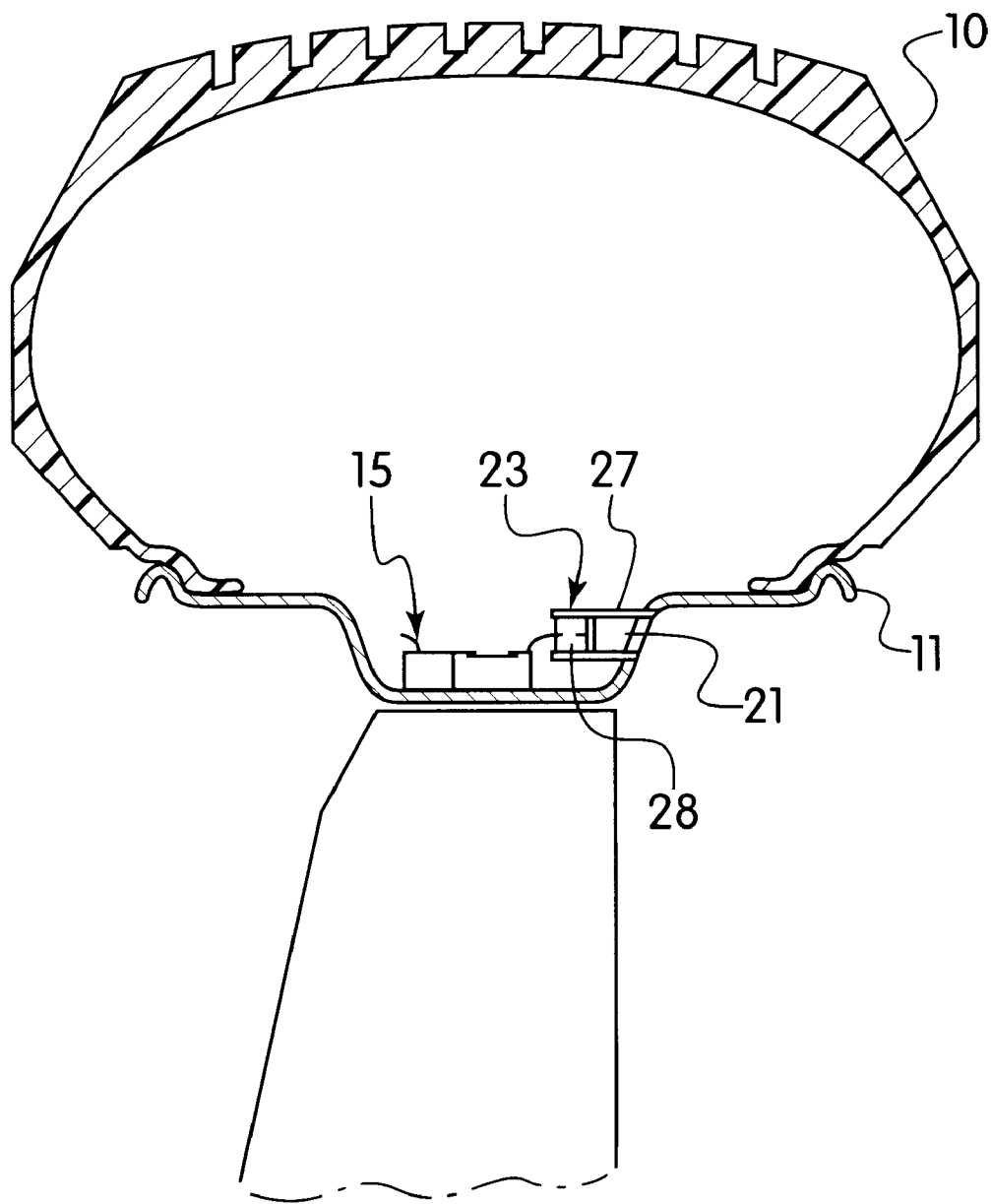
FIG. 1 shows a cross-sectional view of the pressure release assembly mounted to a vehicle wheel.

Referring now in detail to the drawings and, in particular, FIG. 1, there is shown a cross-section of a vehicle wheel, comprising a tire 10 mounted to a rim assembly 11, onto which a wheel-mounted unit 15, is mounted. Unit 15 comprises a pressure release assembly 23 mounted in an aperture 21 of rim assembly 11 to seal aperture 21. Upon rotation of the tire 10 for a predetermined number of rotations or a predetermined period of time, pressure release assembly 23 is retracted and released from aperture 21 to let the air out of tire 10 and prevent the vehicle from being driven. Pressure release assembly 23 is comprised of a valve 27 connected to an electrically driven actuator 28.

Figure 2:
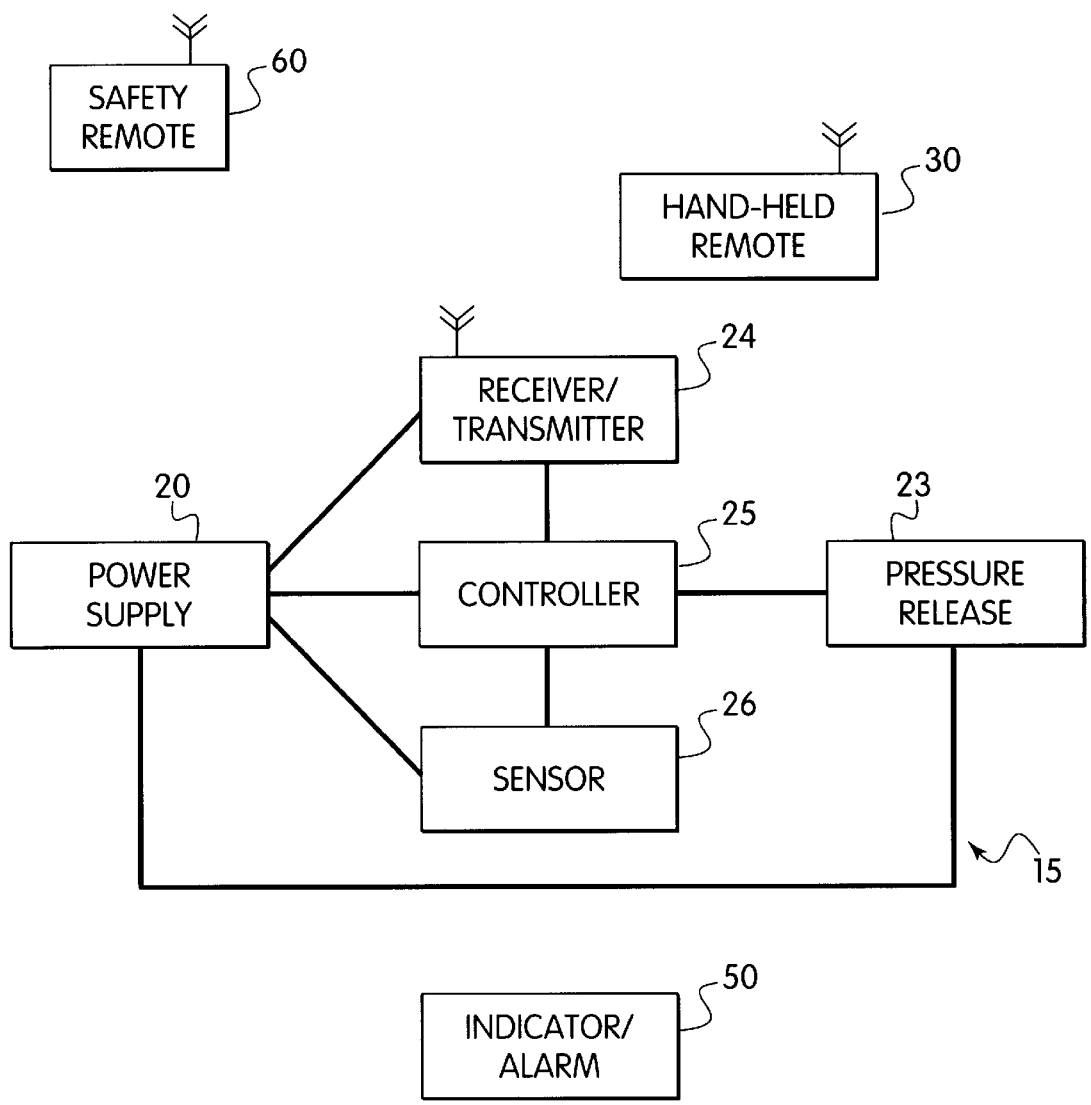
FIG. 2 is a schematic diagram of the tire disabling system according to the invention.
Figure 3:
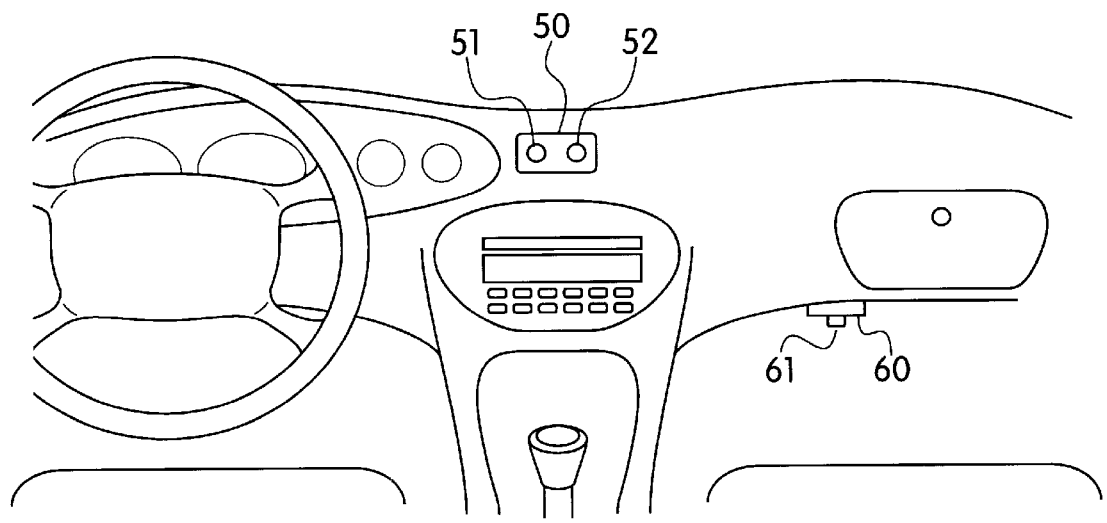
FIG. 3 shows a perspective view of a vehicle dashboard with an indicator unit according to the invention mounted thereto.

A block diagram of all of the components of the invention is shown in FIG. 2. The invention includes a hand-held remote unit 30, and an in-wheel unit 15 comprised of a power supply 20 connected to a receiver/transmitter 24, a controller 25, a sensor 26 and pressure release assembly 23. In addition, a dashboard-mounted indicator/alarm unit 50 and a safety remote 60 form part of the invention. As shown in FIG. 3, unit 50 has an indicator light 51 and an alarm light 52, which communicate to the driver the status of the system, i.e., whether it is disabled (all lights are off) armed (indicator light 51 is on), or about to deflate the tires (alarm light 52 is on or blinking). An audible alarm may also be installed in unit 50 to further alert the driver of impending deflation of the tires. Unit 50 is preferably connected to and powered by the vehicle's battery (not shown). FIG. 3 also shows a safety remote 60 and button 61 to disable the system.

Figure 4:
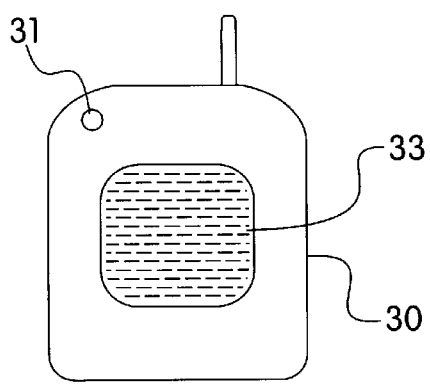
FIG. 4 shows a front view of the hand-held remote unit according to the invention.

Remote unit 30, as shown in FIG. 4, has a button 33 to disable the system, and an indicator light 31, to indicate when the button is pressed. Remote unit 30 is powered by a conventional battery (not shown).

Remote unit 30 and indicator/alarm unit 50 all communicate with receiver/transmitter 24 in in-wheel unit 15 through the use of coded radio-frequency (RF) signals. This technology is well known for many uses including garage doors and toll collection and is thus not explained in detail. Alternatively, other types of signals could also be used.

The system works as follows: Sensor 26 in in-wheel unit 15 senses when a vehicle comes to a stop and the tires are no longer rotating. At this point, a time delay is started to arm the system. For example, after sensor 26 sensing ten minutes of no motion at all, such as when the vehicle is parked, controller 25 activates the system. Controller 25 is a microprocessor that controls all of the functions of the system. In addition, receiver/transmitter 24 sends an RF signal to indicator/alarm 50 and illuminates indicator light 51, to notify the driver that the system is armed.

Pressing button 33 on hand-held remote 30 sends an RF signal to controller 25 to deactivate the system and prevent deflation of the tires.

If the vehicle is driven without deactivating the system, pressure release assembly 23 is activated to deflate one or more of the vehicle's tires. The procedure for this is as follows: Sensor 26, which is mounted to wheel rim 11, senses tire rotation and speed. Sensor 26 is connected to controller 25, which monitors information received from sensor 26. When a predetermined number of tire rotations has occurred, such as four, or ten, controller 25 causes receiver/transmitter 24 to send an alarm signal to indicator/alarm 50, which illuminates alarm light 52 and sounds an audible alarm.

Subsequently, controller 24 activates pressure release assembly 23, to release the air through aperture 21. The time delay between activation of alarm 52 and deflation of the tires can be anywhere from 20 seconds to 1 minute. It is important that pressure release assembly 23 is not immediately deployed upon a small movement of the wheels, because the tires should not deflate if the vehicle is nudged by an adjacent car during parking. In addition, it is necessary to provide the driver a sufficient amount of time to find remote unit 30 and deactivate the system in the even that he or she forgot to deactivate it prior to driving.

There is also an additional safety remote deactivation unit 60 mounted to the inside of the vehicle so that the driver can deactivate the system by pressing an off button 61 prior to tire deflation. This additional remote is necessary in case the driver is unable to locate the hand-held remote unit 30, or if it is inaccessible. Preferably remote 60 is hidden in an inconspicuous location within the vehicle so that it is not visible to thieves.

Each wheel of the vehicle could have a separate in-wheel unit 15, all communicating with remote unit 30 so that all of the tires deflate simultaneously. However, usually one flat tire is enough to disable the vehicle. Pressure release assembly 23 could take many forms, such as a solenoid valve. Any suitable plug-type assembly that can be actuated by an electrical signal could be used.

Power supply 20 powers receiver/transmitter 24, controller 25, sensor 26 and pressure release assembly 23. Power supply 20 is preferably a battery with a long life.

When pressure release assembly 23 is activated and tire 10 deflated, valve 27 is in a recessed position. After deflation, valve 27 is automatically reset into orifice 21 in wheel rim assembly 11. At this point, the driver can re-inflate the tires and continue driving if the system is deactivated with remote unit 30 or safety remote 60. If the system is not deactivated, further driving after re-inflation will simply cause the tires to deflate again. With alternative plug type pressure release assemblies, the assembly must be reset manually.

Accordingly, while only one embodiment of the present invention has been shown and described, it is obvious that many changes and modifications may be made thereunto without departing from the spirit and scope of the invention.

What is claimed is:

1. A system for deflating a tire on a wheel of a vehicle, comprising:
    at least one wheel-mounted unit comprising:
        a pressure release assembly mounted in an orifice of the wheel for deflating the tire;
        a sensor mounted to the wheel and adapted to sense wheel rotation;
        a controller connected to said sensor and pressure release assembly, said controller being adapted to actuate said pressure release assembly in response to wheel rotation sensed by the sensor;
        a receiver connected to said controller and adapted to receive incoming RF signals; and
        a power supply connected to and supplying electrical power to said pressure release assembly, sensor, controller and receiver; and
    at least one remote unit adapted to transmit an RF signal to the receiver to deactivate the wheel mounted unit.

2. The system according to claim 1, wherein the remote unit is a portable, hand-held device.

3. The system according to claim 1, wherein the pressure release assembly comprises a valve in the orifice, said valve being connected to the power supply, wherein electrical current from the power supply in response to a signal from the controller causes the valve to retract out of the orifice and release pressure from the tire.

4. The system according to claim 3, wherein the valve is automatically reset in the orifice after deflation of the tires.

5. The system according to claim 1, wherein the pressure release assembly is mounted on an interior surface of the wheel.

6. The system according to claim 1, further comprising a transmitter in the wheel-mounted unit adapted to send RF signals to a remote location, and an indicator mounted to the dashboard of the vehicle, said indicator indicating activation and deactivation of the wheel mounted unit in response to a signal from the transmitter.

7. The system according to claim 6, wherein the transmitter sends a signal to the indicator prior to actuation of the pressure release assembly to warn of activation of the pressure release assembly.

8. The system according to claim 7, further comprising an audible alarm in the indicator unit, said alarm sounding upon a signal from the transmitter.

9. The system according to claim 6, wherein the indicator is connected to and powered by the vehicle's battery.

10. The system according to claim 1, wherein the power source is at least one battery.

11. The system according to claim 1, further comprising an additional remote unit mountable within the vehicle and comprising a power source and a button, wherein pressing the button deactivates the wheel-mounted unit.

12. The system according to claim 1, wherein the wheel-mounted unit is automatically activated to monitor wheel rotation and activate the pressure release assembly upon the sensor sensing an absence of wheel rotation for a predetermined period of time.

* * * * *